United States Patent
Mazumder (10) Patent No.: US 6,793,140 B2
(45) Date of Patent: Sep. 21, 2004

(54) MACHINE-READABLE CODE GENERATION USING DIRECT METAL DEPOSITION

(75) Inventor: Jyoti Mazumder, Ann Arbor, MI (US)

(73) Assignee: The P.O.M. Group, Auburn Hills, MI (US)

(*) Notice: Subject to any disclaimer, the term of this patent is extended or adjusted under 35 U.S.C. 154(b) by 0 days.

(21) Appl. No.: 10/044,331

(22) Filed: Jan. 10, 2002

(65) Prior Publication Data

US 2002/0166896 A1 Nov. 14, 2002

Related U.S. Application Data

(60) Provisional application No. 60/260,925, filed on Jan. 10, 2001.

(51) Int. Cl.[7] .................... G06K 19/00; G06K 19/06; G06K 7/10
(52) U.S. Cl. .................. 235/487; 235/494; 235/462.01
(58) Field of Search ............................. 235/462.01, 487, 235/488, 489, 490, 491, 494; 700/123

(56) References Cited

U.S. PATENT DOCUMENTS

| | | | |
|---|---|---|---|
| 5,053,609 A | | 10/1991 | Priddy et al. ............... 235/436 |
| 5,521,371 A | * | 5/1996 | Hotta et al. ................. 235/487 |
| 5,837,960 A | * | 11/1998 | Lewis et al. ........... 219/121.63 |
| 6,122,564 A | * | 9/2000 | Koch et al. ................. 700/123 |
| 6,472,029 B1 | * | 10/2002 | Skszek ....................... 427/554 |

* cited by examiner

Primary Examiner—Thien M. Le
Assistant Examiner—April Nowlin
(74) Attorney, Agent, or Firm—Gifford, Krass, Groh, Sprinkle, Anderson & Citkowski, PC (57) ABSTRACT

Direct metal deposition (DMD™), preferably closed-loop DMD, is used to deposit machine-readable codes onto articles with high accuracy, directly from digital data. In different embodiments, the substrate/layer combination may be tailored for improved wear resistance, thermal conductivity, density/hardness, corrosion and/or resistance to corrosion, oxidation or other environmental conditions. Alternatively, the layer(s) of material may be tailored to have specific properties custom-tailored to suit the application. To enhance throughput, code features may be fabricated using a robotic closed-loop DMD arrangement. In concert with the improvements made possible through the tailored outer layer(s), the method may further include the step of incorporating a third dimension by controlling the height of the deposit line in addition to the width.

11 Claims, 14 Drawing Sheets

MACHINE-READABLE CODE GENERATION USING DIRECT METAL DEPOSITION

REFERENCE TO RELATED APPLICATION

This application claims priority from U.S. Provisional Patent Application Ser. No. 60/260,925, filed Jan. 10, 2001, the entire contents of which are incorporated herein by reference.

FIELD OF THE INVENTION

This invention relates generally to additive manufacturing and, in particular, to the fabrication of machine-readable codes such as one or two-dimensional barcodes using closed-loop, laser-based, direct metal deposition (DMD™).

BACKGROUND OF THE INVENTION

Compared to one-dimensional barcodes of the type found on grocery items and consumer products, two-dimensional barcodes are now recognized as a way of automatically identifying objects with much greater information content. One- and two-dimensional codes are now used on many engineering components to track genesis and to prevent proliferation of poor-quality copies. Many of these components are expensive yet rendered obsolete after a modest service life due to hostile operating conditions. The desired durability of machine-readable codes on components depends on service conditions and applications. However, if the coding system cannot survive such environment, the history of origin cannot be tracked for proper replacement.

Different two-dimensional bar codes are in use, including the codes devised by Data Matrix International, as described in U.S. Pat. No. 5,053,609 and the patents which depend therefrom, all of which are incorporated herein by reference. Presently Data Matrix codes are marked in several ways, including:

1) Laser marking: Surface changes are made by focusing laser energy to cause one or more of the following:
    a) Surface etching;
    b) Surface annealing and burning which changes surface reflectance; and
    c) Engraving.
2) Dot Peening: In this process, a marker stylus is pressed against the surface of the material to create an indentation. Colors can be added to these depressions to improve contrast. Typical resolutions of these marking are in the order of 250 micrometers wide and 100 micrometers deep.
3) Ink Jet Printers: In this method, ink is sprayed from a printer head to an article surface to create marks. The longevity of the mark depends on the chemical reaction of the ink with the substrate.

The permanence of all three processes described above is limited in severe reactive environment and high-temperature environments due to shallow surface penetration or possible reaction with the environment. Earth moving and rotating components are subjected to high wear and erosion environment. Certain aircraft components have a service life exceeding 30 years and such durable codes are valuable in tracking history in case of replacement or accident. Turbines for aircraft and power generation are exposed to both high-temperature and oxidizing atmospheres. The ability to survive under such conditions is critical for future identification of the components after years of service.

A method of material deposition capable of enduring hostile and/or high temperature environment directly from digital data will resolve this "service longevity" issue.

SUMMARY OF THE INVENTION

According to this invention, direct metal deposition (DMD™) is used to deposit machine-readable codes onto articles with high accuracy, directly from digital data. In the preferred embodiment, a closed-loop DMD process is used to achieve high accuracy and resolution. The use of DMD also offers a large portfolio of deposition materials, including nickel super alloys for withstanding hostile and high-temperature environments, and H13 tool steel for high wear resistance. In the case of lightweight aircraft components made with aluminum and titanium, the process can be used to deposit Al and Ti, as well as more durable Al & Ti alloys. Moreover, as the technology of symbology improves to include three-dimensional features, DMD, particularly CLDMD, will be used to deposit predetermined heights with well-defined widths and spacings to open up a new dimension in coding systems.

According to the method of the invention, one or more layers of material are deposited onto the surface of an article using the laser-assisted DMD process to achieve desired dimensional characteristics. In different embodiments, the substrate/layer combination may be tailored for improved wear resistance, thermal conductivity, density/hardness, corrosion and/or resistance to corrosion, oxidation or other environmental conditions. Alternatively, the layer(s) of material may be tailored to have specific properties custom-tailored to suit the application.

In the preferred embodiment, a closed-loop, laser-assisted DMD process is deployed to write the symbol on the component substrate on an incremental basis using the digital data from the code generation program. To enhance throughput, code features may be fabricated using a robotic closed-loop DMD arrangement. In concert with the improvements made possible through the tailored outer layer(s), the method may further include the step of incorporating a third dimension by controlling the height of the deposit line in addition to the width. Indeed, as opposed to, or in conjunction with, a computer-readable code, the method and apparatus of the invention may be used to construct a one- or multi-dimensional "test region" on an article or substrate, enabling human or machine visualization to determine the level of wear, service, corrosion, remaining life, and so forth, by viewing and analyzing the degradation of one or more deposited features, whether of the same or different material composition.

DETAILED DESCRIPTION OF THE INVENTION

As described in U.S. Pat. No. 6,122,564, the entire contents of which are incorporated herein by reference, the closed-loop direct metal deposition (DMD™) process may be employed to trace a desired tool path generated by a suitably equipped CAD/CAM system. A complex shape is generated by delivering desired material (i.e., metal/alloy powder or wire) to a laser-melted pool, with a finished surface feature being created by changing the relative position of the laser beam and the substrate. The system may use a stationary beam and material delivery system in conjunction with a moving substrate, or the beam and material delivery system may be moved relative to a stationary substrate.

Figure 1:
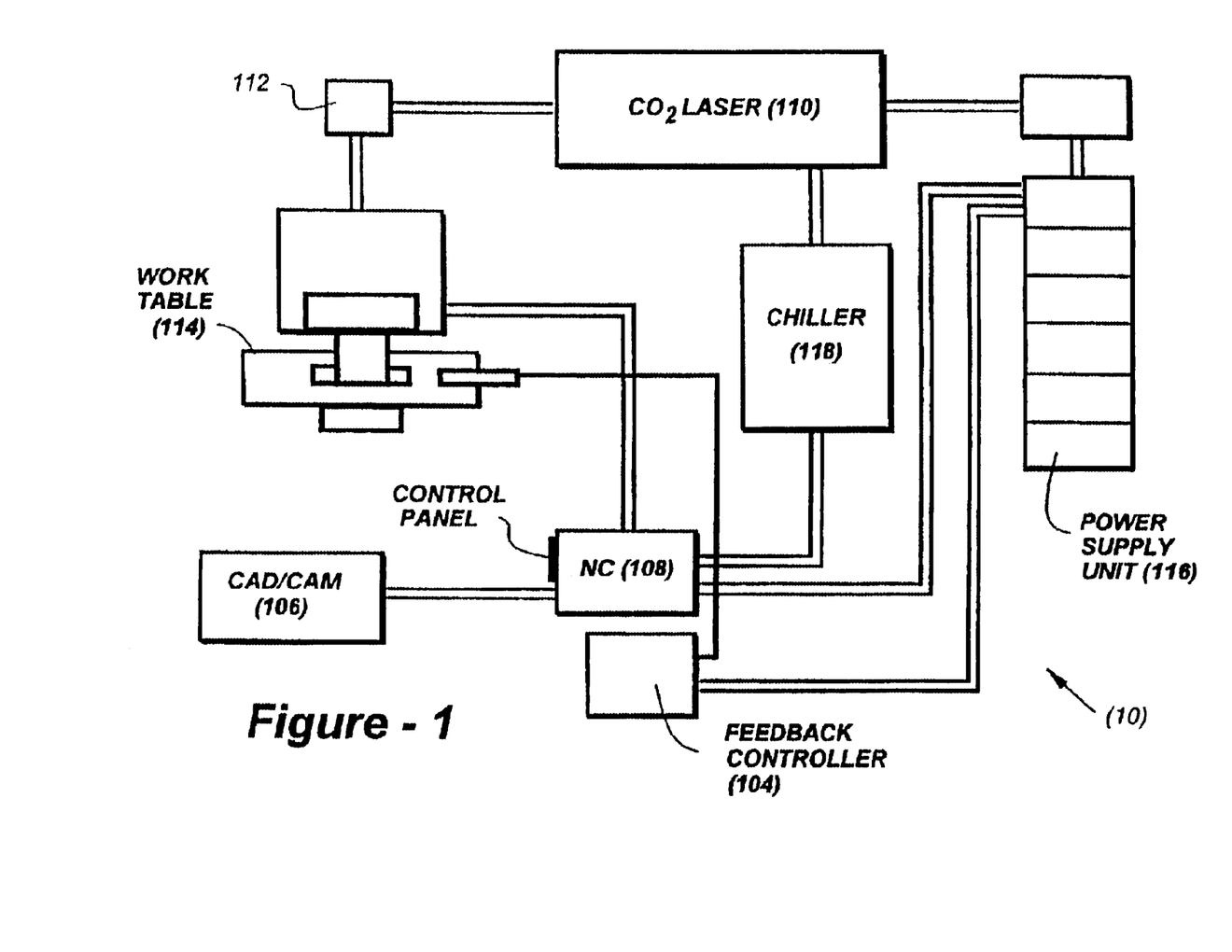
FIG. 1 shows a direct metal deposition (DMD) system with stationary beam and moving substrate.
Figure 2:
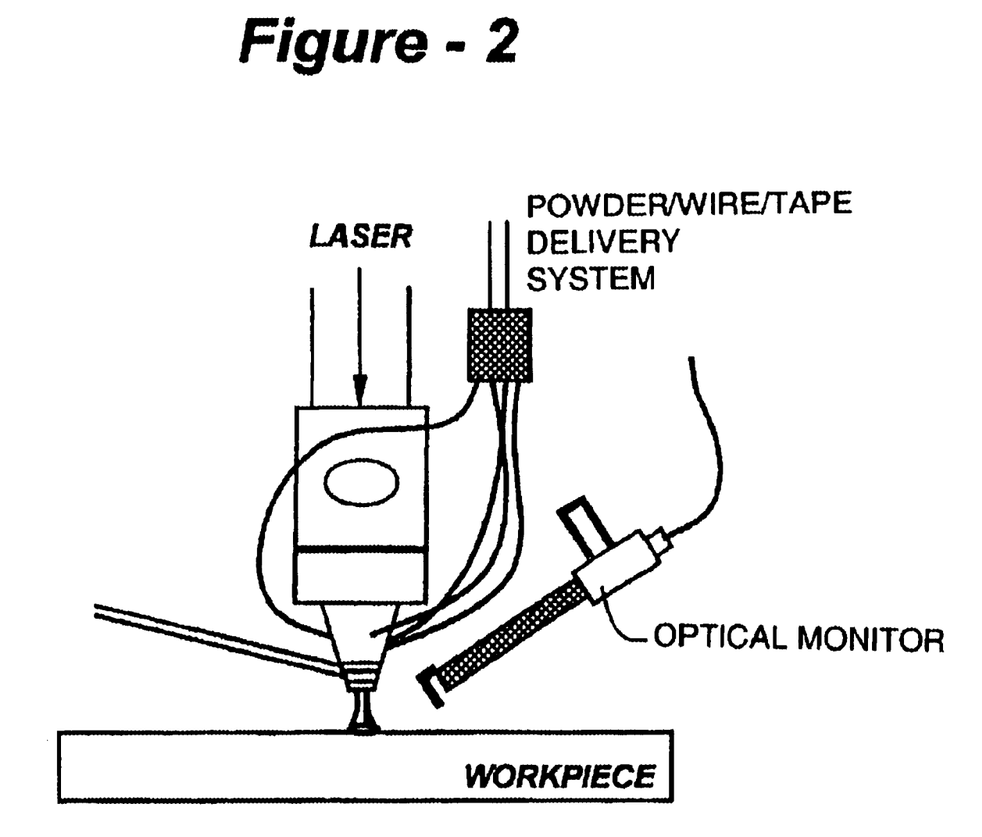
FIG. 2 is a close-up view of the deposition head and optical feedback monitoring system.

FIG. 1 shows a laser-aided, computer-controlled DMD system schematically at being used to apply layers of material 20 on a substrate 30 to fabricate a machine-readable code according to the invention. The system is preferably equipped with feedback monitoring, better seen in FIG. 2, to control of the dimensions and overall geometry of the fabricated code.

The geometry of the code is provided by symbology program which is interfaced with a computer-aided design (CAD) and computer-aided manufacturing (CAM) system to provide necessary instructions to the DMD machine. Although the code(s) prescribed by Data Matrix International will be used as an example herein, it will be understood that the system and method are not limited in this respect, and may be used to fabricate one-dimensional (i.e., bar) codes, other types of 2-D codes, and 3-D structures.

The deposition tool path is generated by a computer-aided manufacturing (CAM) system for CNC machining with post-processing software for deposition, instead of software for removal as in conventional CNC machining. CAM software interfaces with a feedback controller 104. These details of the laser-aided, computer controlled direct material deposition system can be found in U.S. Pat. No. 6,122,564, and are not all explicitly shown in FIGS. 1 and 2.

Figure 5:
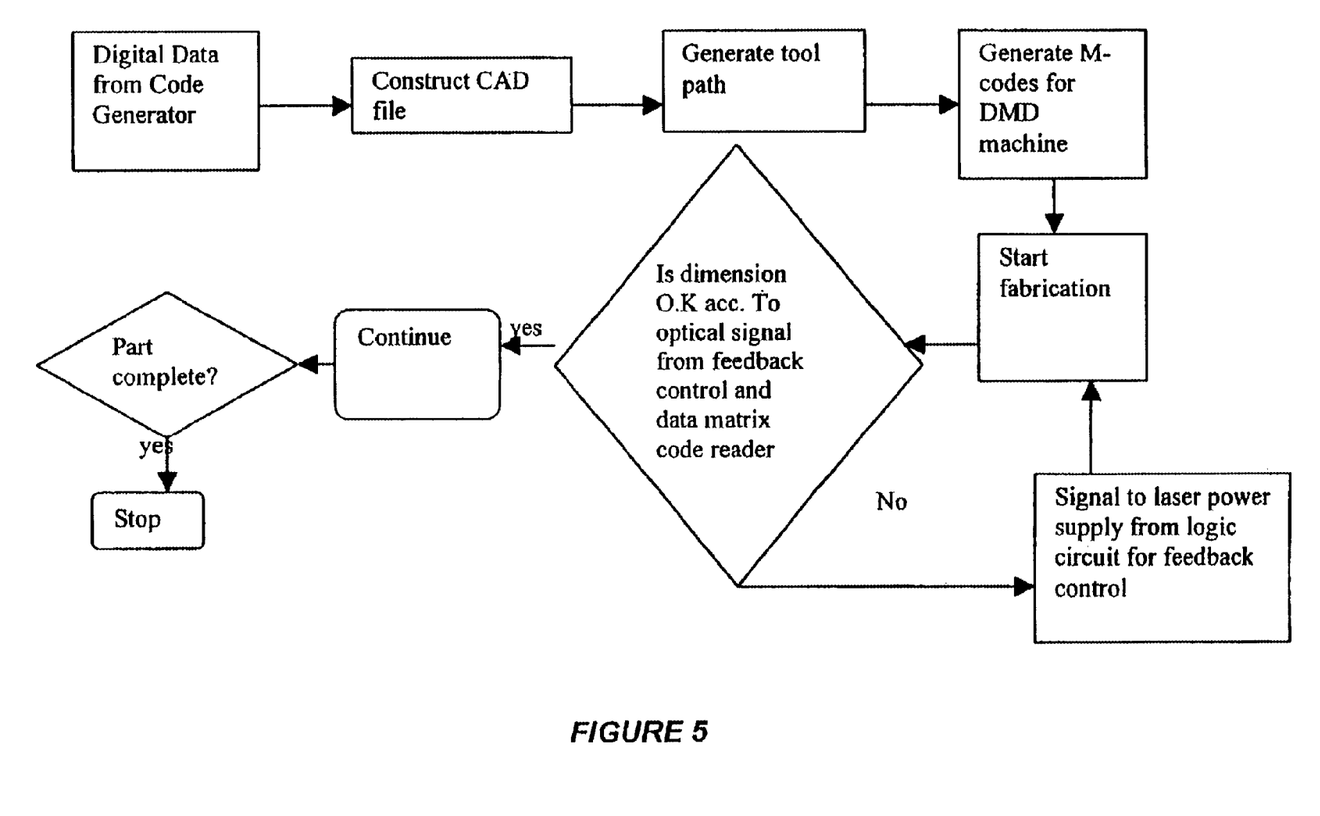
FIG. 5 is a flowchart showing how one- or multiple-dimensional barcodes are fabricated using DMD.

FIG. 5 is a flow chart associated with the fabrication of the Data Matrix codes using DMD. Dimensional accuracy of at least the vertical dimension is best achieved with closed-loop optical feedback control (CLDMD), as described in the U.S. Pat. No. 6,122,564. Projecting the image on a linear array detector and continuously counting the illuminated pixels can monitor width of the deposit. The same result can also be obtained by monitoring the video signal used for the visual inspection of the process.

A major design flexibility includes the capability of depositing different materials for different applications. The feedback loop can account for the deposition behavior of different material and maintain a close dimensional tolerance. For example, a nickel super alloy can be deposited on a turbine blade made out of the same alloy, whereas tool steel can be deposited on die cavity for permanent marking of products. Another flexibility is adjustable feature size. Using adaptive optics or multiple passes, feature sizes may be adjusted at will, providing additional design tool for data coding. Deposit heights can also be adjusted, particularly with CLDMD, thereby providing additional flexibility for data encoding.

The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed codes with complex geometries and within control tolerances. Accordingly, the feedback controller 80 of the direct material deposition system typically cooperates directly with the numerical controller 90, which, itself, controls all functions of the direct material deposition system, including laser power.

The laser source 110 of the DMD system is mounted above the substrate and a layer of material is deposited according to the description of the object. The laser has sufficient power density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, and U.S. patent application Ser. No. 09/671,535, so that the powder exits the nozzle co-axially with the beam.

Figure 3:
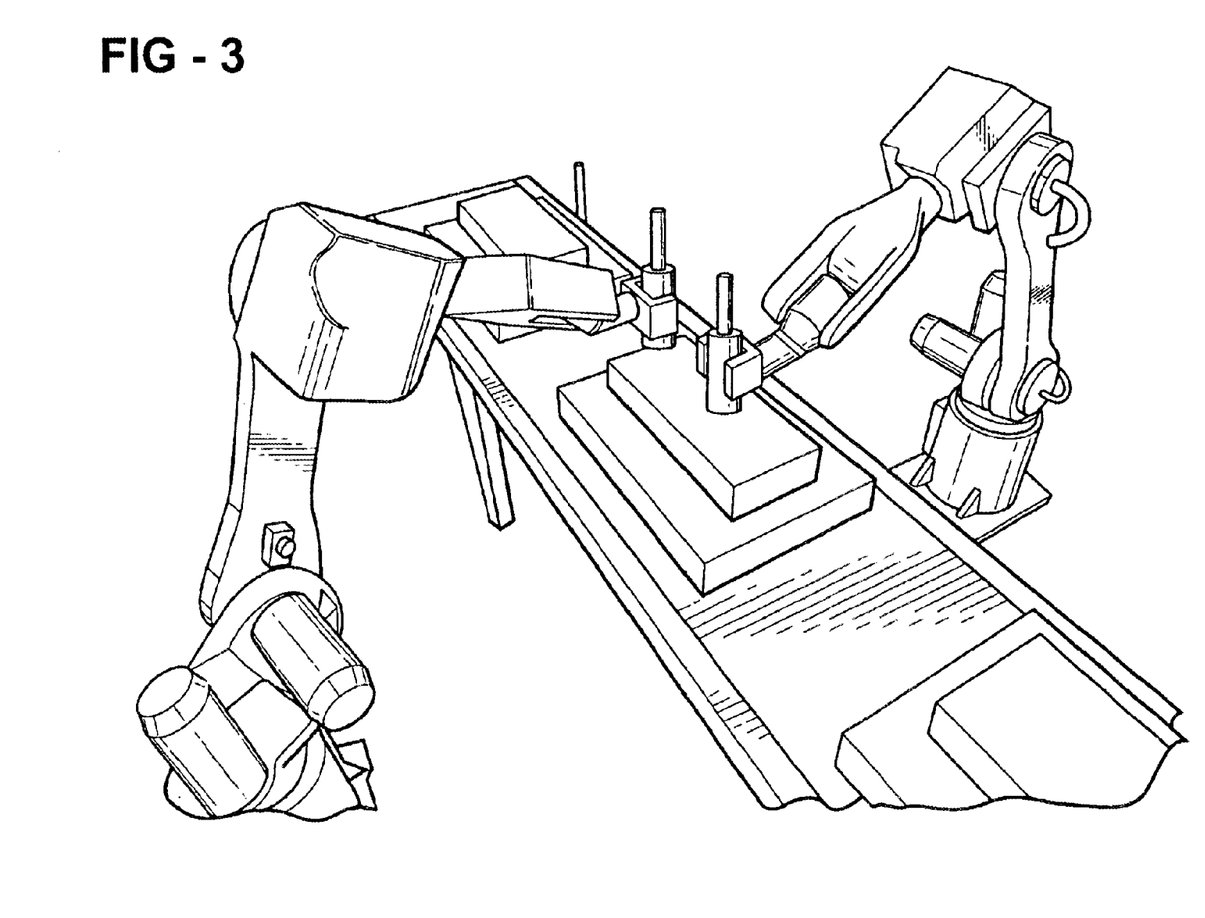
FIG. 3 illustrates a robotic DMD embodiment.
Figure 4:
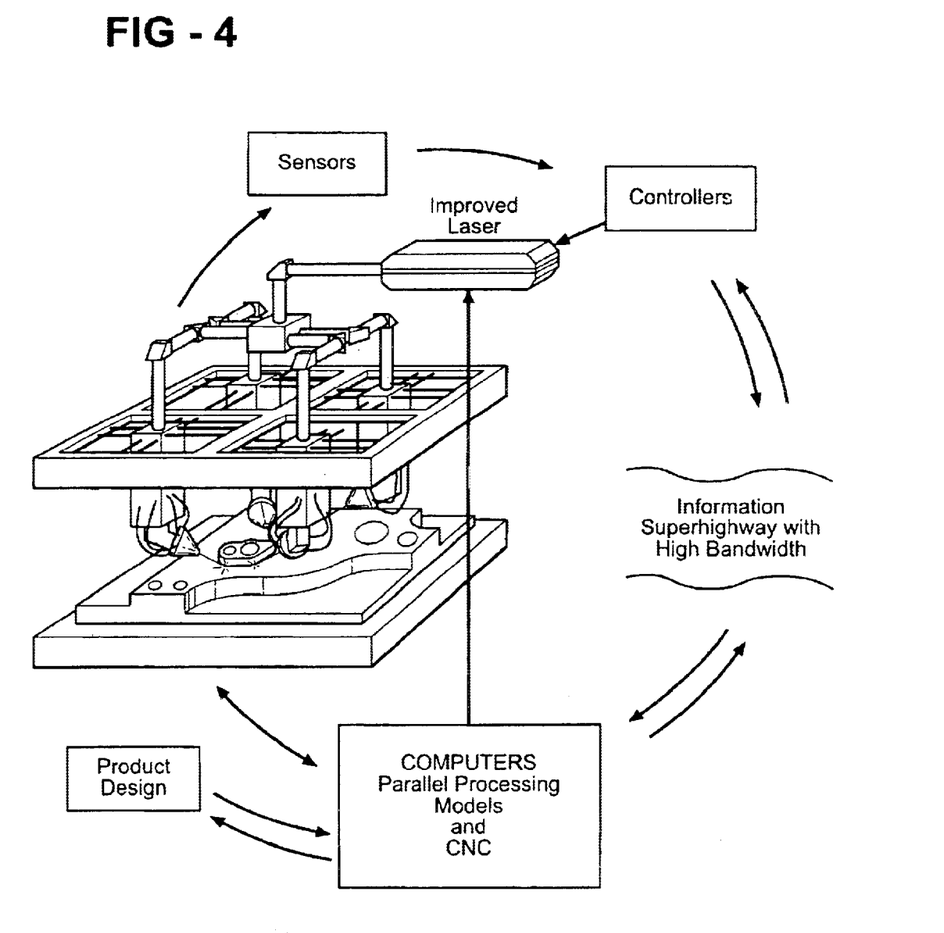
FIG. 4 illustrates how a DMD system may be improved with sensors and high-speed communications.

A numerical controller 108 controls all operating components of the DMD system of FIG. 1, including the operating conditions of the laser, receiving direction from the CAD/CAM system 106 for building the part or product. The numerical controller 108 also receives feedback control signals from the feedback controller 104 to adjust laser power output, and further controls the relative position of the substrate and laser spray nozzle. A typical system further includes a laser beam redirector 112, a chiller 118 to cool the laser, a work table 114, and a power supply unit 116 feeding various subsystems shown in the figure. The CAD/CAM system 106 is equipped with software which enables it to generate a path across the substrate for material deposition. Other refinements, such as robotic handling and multiple deposition heads for simultaneous deposition onto a die surface, are depicted in FIGS. 3 and 4, respectively.

According to this invention, the CLDMD process is used to deposit desired alloys on an existing surface of a die or other component. To accommodate an entirely new design, or to change an existing design, the area on the object can either be machined off to a desired shape and subsequently built over using CLDMD directly from the new CAD data or built over the existing surface, if the new design can accommodate it.

The optical feedback loop preferably maintains fabrication tolerances to within 25 to 150 microns. Material can be delivered at the laser-melted pool by various means, including pneumatic powder delivery, wire feed or tape feed. Either the same material as the substrate or any other metallurgically compatible material can be deposited using this process. Through proper selection of the deposited material, properties can be tailored to application requirement in addition to the geometric requirements. Surface oxidation during the process is minimized by inert shielding gas delivered either through the concentric nozzle or separate shielding nozzle. Under special circumstances, the process may be carried out in a sealed chamber providing an inert atmosphere.

MATERIALS AND PROCESS PARAMETERS

A preferred strategy for materials and process parameter selection for a code generation will now be described, as follows:

Selection of Elements

A proper choice of elements is important for promoting enhanced service life, as well as for protecting against chemical degradation. For example, chromium promotes a body-centered cubic (B.C.C.) phase for ferrous alloys, whereas chromium oxide ($Cr_2O_3$) forms a passive surface layer to inhibit corrosion at temperature up to 800° C. Reactive elements such as yttrium and hafnium are known to stabilize $Al_2O_3$ at temperatures above 800° C., leading to high-temperature oxidation resistance. Thus, selection of alloys and elements may be adjusted according to the invention to suit the service requirement.

Selection of Process Parameters

Process parameters control the deposition definition such as line width and height, as well as the deposit microstructure. Therefore, the process parameters should be carefully selected to promote the desired dimension and properties. The geometry of single track and multiple tracks needed for code generation were extensively studied, and significant process parameters were identified for control of deposit dimension and hardness. The following examples provide additional details:

EXAMPLES

Example 1

Effect of Process Parameters on H13 Tool Steel Deposition Dimension and Hardness The AISI H13 tool steel powder used in the fabrication of test specimens is induction melted and nitrogen atomized. The powder is 100 mesh size [150 $\mu$m] and had the following composition:

TABLE I

| H13 Composition by Weight Percent | | | | | | | | | | |
|---|---|---|---|---|---|---|---|---|---|---|
| C | Si | Mn | Cr | Mo | V | P | S | O | N | Fe |
| 0.40 | 0.93 | 0.35 | 5.31 | 0.30 | 1.07 | 0.016 | 0.005 | 0.006 | 0.048 | balance |

Process Parameters Considered

Because the laser-aided direct metal deposition process is very complex, many parameters must be considered. A summary of the parameters described affecting the deposition process is given as following:

| Shied and Delivery Gas Type | |
|---|---|
| Shied Gas Flow | [CFH] |
| Delivery Gas Flow | [CFH] |
| Metal Powder Particle Size | [Mesh] |
| Nominal Laser Power | [W] |
| Traverse Speed | [ipm] |
| Beam Defocus | [10/1000"] |
| Powder Feed Rate | [g/min.] |
| Layer Height (z- Increment) | [10/1000"] |
| Percentage Track Overlap | [%] |
| Sensor Reset Frequency | [Hz] |
| Signal Duty Cycle | [%] |
| Sensor Filter | [ND] |

The process gas used as the shield—and delivery gas in this example was helium due to its high ionization potential compared to other inert gasses. This gas minimizes plasma formation during the DMD process and promotes better process stability. The gas flow rates were optimized before the experiment and held constant for all experiments. It is desired to have a very well shaped powder stream emanating from the nozzle, which means that no powder spreads out of the gas stream, as well as a small stream waist size.

It is well known that a significant difference between the shield—and delivery process gas streams will affect the entire gas and particle flow in a negative way. The powder used for the H13 experiments has the mesh size 100 [150 $\mu$m in average] and is used in all experiments. This powder ensures a good flow characteristic in the used powder delivery system because of the particle size and its spherical shape.

H13 Single-Track Metal Deposition Parameters

Process parameters such as nominal laser power, traverse speed, defocusing of the beam and the powder mass flow rate are controlled when creating single track metal depositions. To study the effect of these parameters on the resulting clad geometry, a statistically designed experiment was used. A three-level design with four independent parameters was chosen and required a total of 81 experimental runs. The high and low values for each independent parameter were determined after several test runs to ensure proper limits. The following Table provides a summary of the parameters with their high, middle and low values:

TABLE II

| H13 Clad Map Parameters | | | |
|---|---|---|---|
| Parameter | Low | Medium | High |
| Nominal Laser Power LP [W] | 300 | 450 | 600 |
| Traverse Speed TS [ipm] | 25 | 50 | 75 |

TABLE II-continued

| H13 Clad Map Parameters | | | |
|---|---|---|---|
| Parameter | Low | Medium | High |
| Defocus DFO [1/1000"] | 10 | 20 | 30 |
| Powder Feed Rate PFR [g/30s] | 2 | 4 | 6 |

The dependent parameters are the clad dimensions "deposition width" DW and "deposition height" DH. These dimensions were measured on one cross-section of each single-track deposit with an optical microscope and calibrated measuring devices.

DMD Process Controller Test Specimens

Various experiments were conducted to study the behavior of the deposition height limit controller with its sensor assembly and signal processor circuit as well as the efficiency of the powder feed rate control system. The first of these shows the height fluctuation of a multi-layer test part produced without any DMD process control. That provides a comparison for parts manufactured with an enabled height limit control as well as with a controlled powder feed to the melt pool.

On a second test part, the deposition height limit control was enabled and the improvements made with this sensor system were characterized. A third test part shows the effect of a controlled powder feed rate in addition of the height limit control. For all these experiments it was from particular interest whether the camera arrangement resulted in a uniform height control in the x and y clad direction or whether there was any directional dependence.

The process parameters associated with building the test samples were taken out of the clad map data for H13. It turned out that the selected parameter set was already well optimized for single-track depositions and did not need further fine adjustments. That was verified in further single-track clad tests with slightly different laser power line densities as well as powder delivery rates. These experiment sets had the parameters set as follows:

| | |
|---|---|
| Nominal Laser Power: | 600 W |
| Traverse Speed: | 25 ipm |
| Powder Mass Flow Rate: | 4 g/min. |
| Beam Defocus: | 20/1000" |
| Layer Height (z- increment): | 10/1000" |
| Sensor Reset Frequency: | 42 Hz |
| Signal Duty Cycle: | 95% |
| Sensor Filter: | 1064 nm bandpass interference filter, 1x ND 1 filter |

The deposition width for single-tracks was measured for this set to approximately 500 $\mu$m and the height 250 $\mu$m. That resulted in a height ratio of 2:1.

Figure 6:
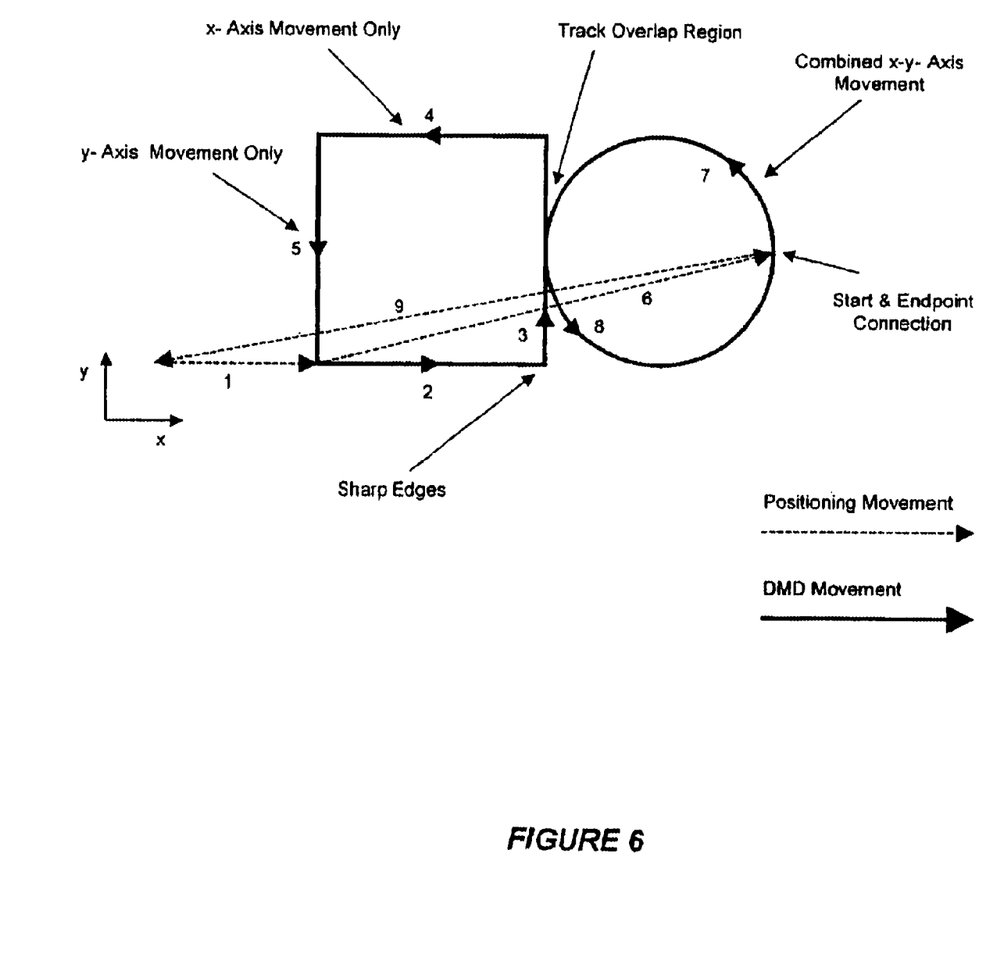
FIG. 6 illustrates a deposition process controller test sample tool path.

The design of the test sample was chosen so that directional dependence of the clad could be studied as well as track overlap appears. This made it easier to demonstrate the capability of DMD to write well defined sharp geometry needed for the (Data Matrix) code. The laser clad direction takes place either only in x- or y-direction in the left hand rectangle tool path or is mixed in the circle from the right hand tool path. Both tool paths are connected in one area so that a complete clad overlap takes place. FIG. 6 shows the test sample tool path as well as the positioning movements of the NC with areas of special interest named and marked as well.

Effect of the Nominal Laser Power on the Deposition Width

Figure 7:
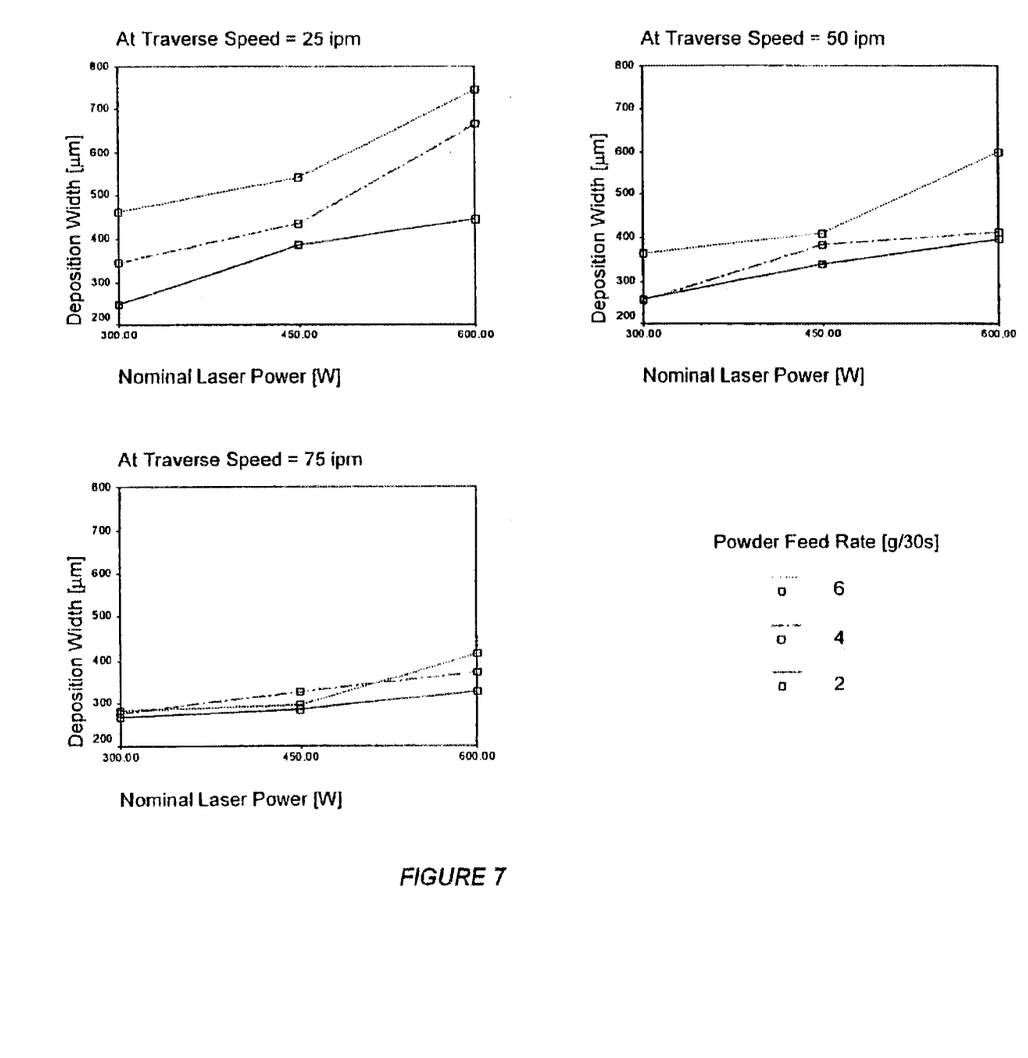
FIG. 7 shows the effect of the nominal laser power on deposition width.

The deposition width was observed as a function of the nominal laser power. FIG. 7 shows that the width increases with the nominal laser power put on the substrate. Because the laser energy is what creates the melt pool, it is reasonable to expect that the melt pool size is dependent on the power density put on the substrate surface. Even when the laser spot size is smaller than the measured deposition with, it is in agreement with actual results. Melting the substrate surface is a thermal process and because of the thermal conductivity of the metal substrate, it is possible to cerate a melt pool bigger than the region of radiation impact.

Comparing the three charts of varying the traverse speed, it becomes visible that increasing the traverse speed will result in a smaller gradient of the deposition width. This is also in agreement with the process, because the impact time of the radiation will be smaller in case of higher traverse speeds. It makes sense to combine both effects with using a quotient of the power density and the traverse speed to describe the situation. This leads to a power line density, which increases with the value for a decrease of the traverse speed or increase of the nominal laser power.

Effect of the Powder Feed Rate on the Deposition Width

Figure 8:
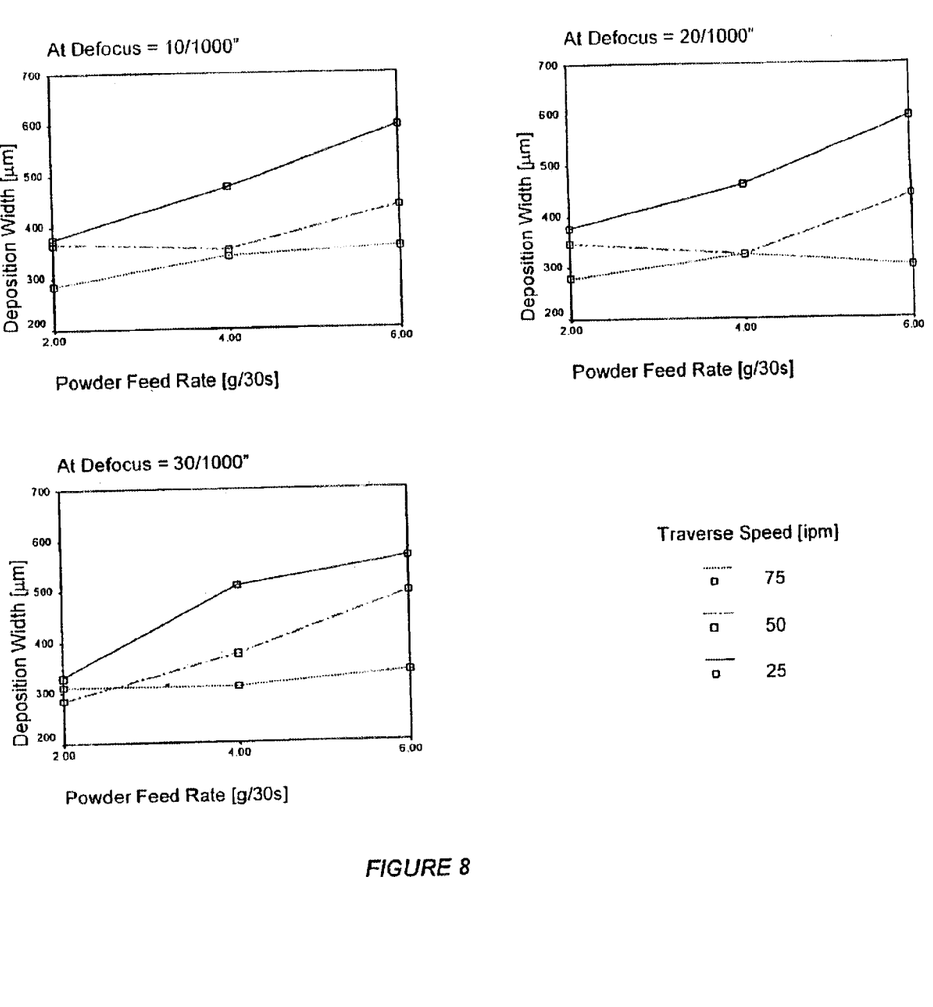
FIG. 8 shows the effect of the powder feed rate on deposition width.

As shown in FIG. 8, increasing the powder feed rate results in a larger deposition width. The reason for this behavior is that the more powder is injected in the melt pool, the deposition can get an increased width. However, there is a limit. In the event of excessive powder injected to the melt pool, a deposition whose cross section is shaped like an $\Omega$ can be the result. This should be avoided because of its weak bond to the substrate or previous tracks, and it is reasonable that this particular clad shape will cause excessive porosity in multi-track/layer parts.

Effect of the Traverse Speed on the Deposition Width

Figure 9:
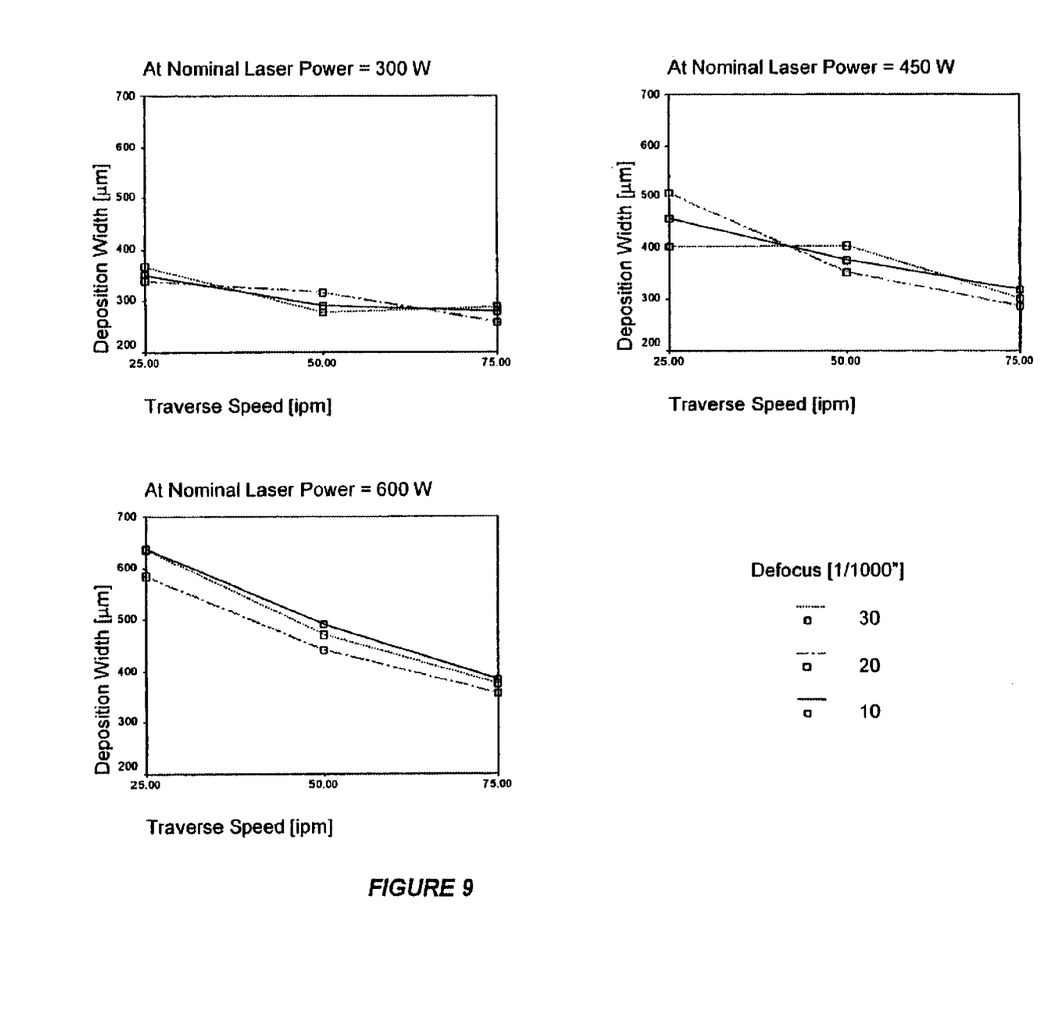
FIG. 9 shows the effect of the traverse speed on deposition width.

The effect of the traverse speed on the deposition width is observed as the opposite of the powder mass flow effect. The charts illustrated in FIG. 9 show the general behavior of the deposition width. The width is decreasing with an increase of the traverse speed. The power line density is smaller for higher traverse speeds and, as a result, the melt pool size will decrease. In addition, the amount of powder per track is lower for higher speeds and higher for lower speeds. A viable explanation is that there is simply less powder injected in the clad zone in case of higher traverse speeds compared to lower ones.

Effect of the Beam Defocus on the Deposition Width

Figure 10:
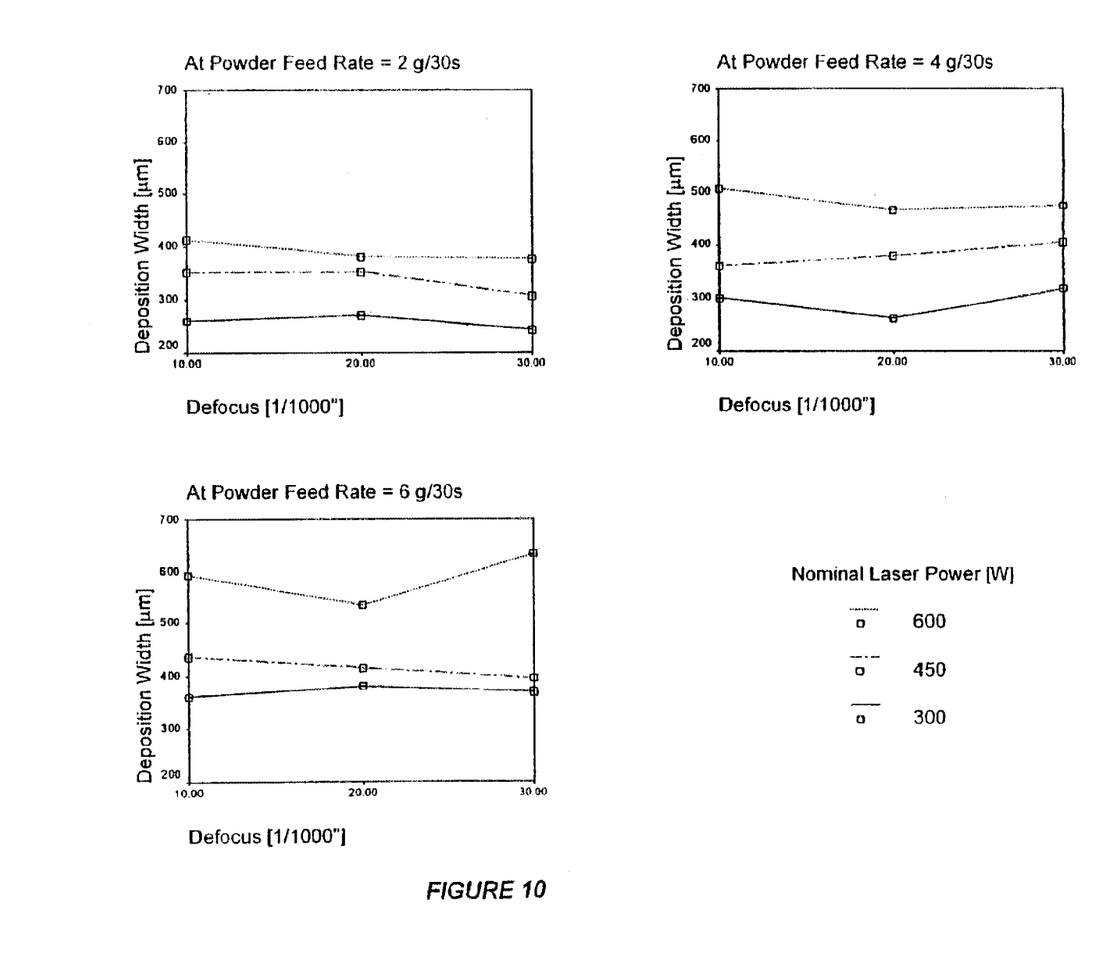
FIG. 10 shows the effect of the beam defocus on deposition width.

The charts features in FIG. 10 show that beam defocus does not have any significant effect on the deposited track width. The graphs are, on average, horizontal over different defocus regions. This is in agreement with calculations made for the optical setup. The smallest spot size is 254 $\mu$m and the biggest defocused one is calculated to 275 $\mu$m. That makes only a relatively small difference in the power density, approximately 8 percent.

Deposition Height of Single-Track

Figure 11:
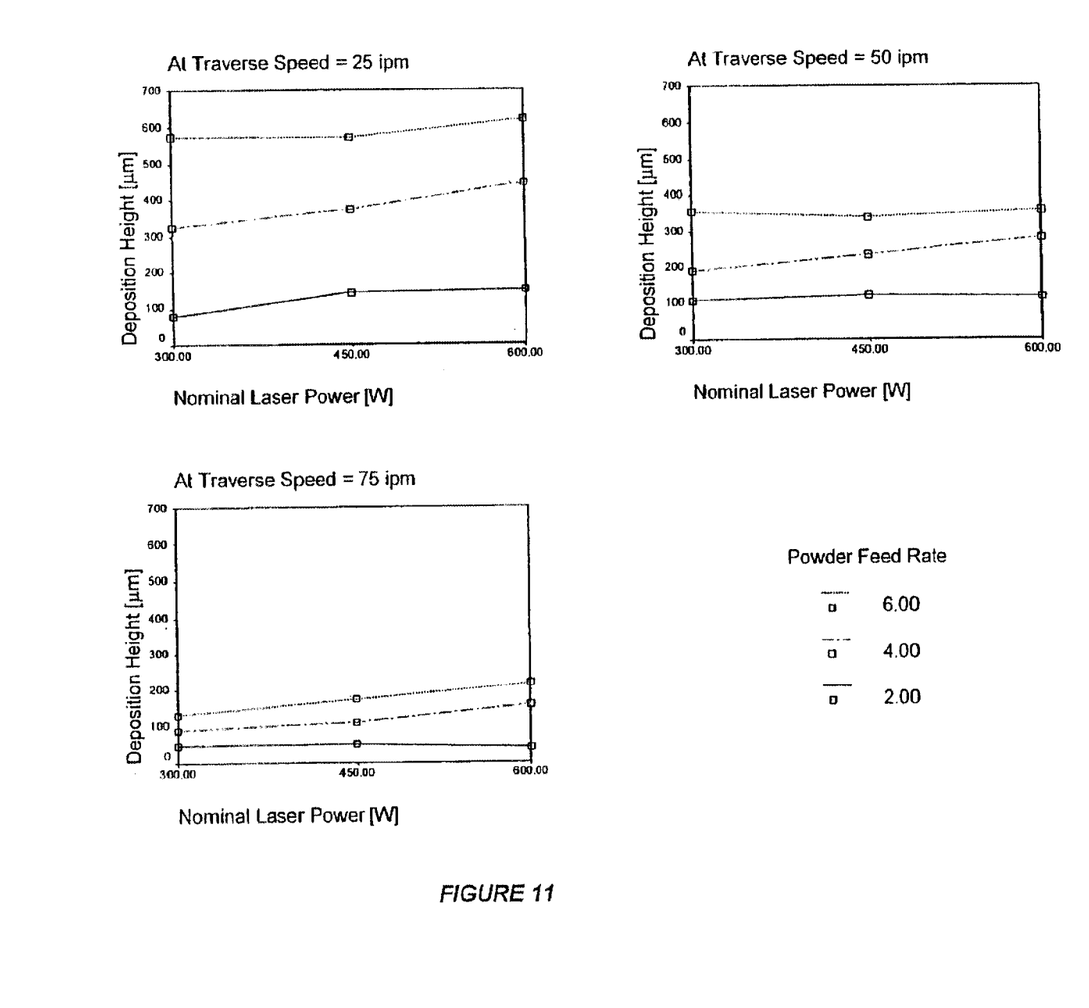
FIG. 11 shows the effect of the nominal laser power on deposition height.

The results of statistical analyses shows that two parameters, namely powder feed rate (PFR) and traverse speed (TS), are the most significant parameters for the deposition height (DH). This significance appears between the low and middle value as well as between the middle and high. The combination of both powder feed rate and traverse speed also has a big effect on the deposit. Some effect is additionally found in the nominal laser power (LP) but not as significantly as the one found for power and speed. As already discussed in the previous section, there is no effect found for a beam defocus (DEF) and addition there was no significant effect of the laser power. The charts shown in FIG. 11 reflect the general effect of the investigated parameters on the deposition height.

Effect of Nominal Laser Power on the Deposition Height

As the following charts show, the nominal laser powder does not affect the deposition height. The height stays almost constant for all different laser power values. As discussed elsewhere herein, increased power density results in a bigger melt pool diameter, which will primarily result in an increased clad width. In addition to the fact that the melt pool is bigger in case of increased power density, gravity can also flatten the clad so that the height does not increase.

Effect of Powder Feed Rate on the Deposition Height

Figure 12:
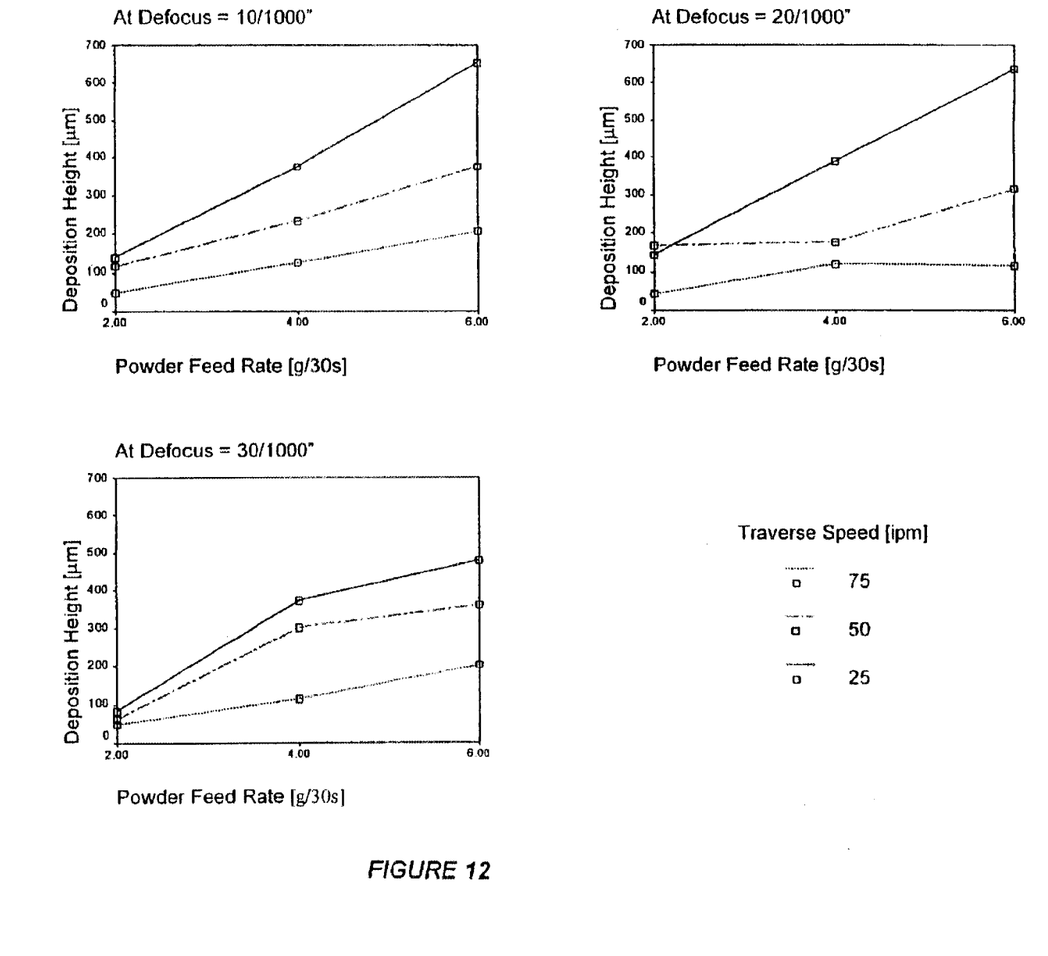
FIG. 12 shows the effect of the powder feed rate on deposition height.
Figure 13:
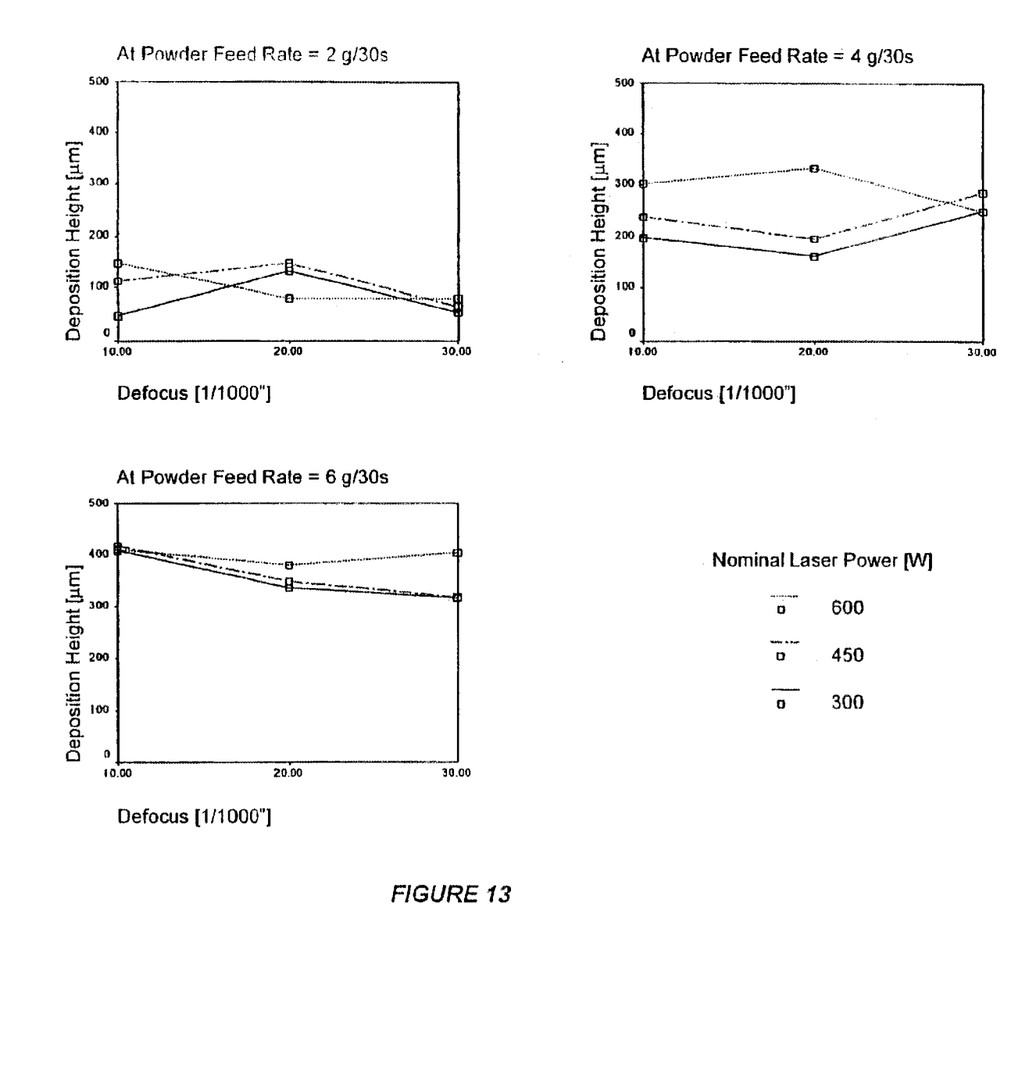
FIG. 13 shows the effect of the traverse speed on deposition height.

The powder mass flow rate has a significant effect on clad width as well as height. As seen in the charts of FIG. 12, there is an increase in height for increased powder flow to observe. Since there is more powder available to melt and solidify in the clad region there is an agreement with the process in reality. The single tracks measured in this experiment show that there is an effect that relatively tall clads have a high degree of porosity.

Effect of the Traverse Speed on the Deposition Height

Traverse speed is the second most significant process parameter for the deposition height. As observed with respect to deposition width, the effect is also the opposite of the powder mass-flow effect.

Increasing the traverse speed results in a decreased height. Because there is less powder available when increasing the speed, this behavior stands in agreement with measured results. It makes sense to combine the regular powder feed rate [mass/time] with the traverse speed. A ratio of mass flow versus traverse speed results in a mass per track length. This value is useful to characterize powder effect since it contains both significant effects.

Effect of the Beam Defocus on the Deposition Height

Figure 14:
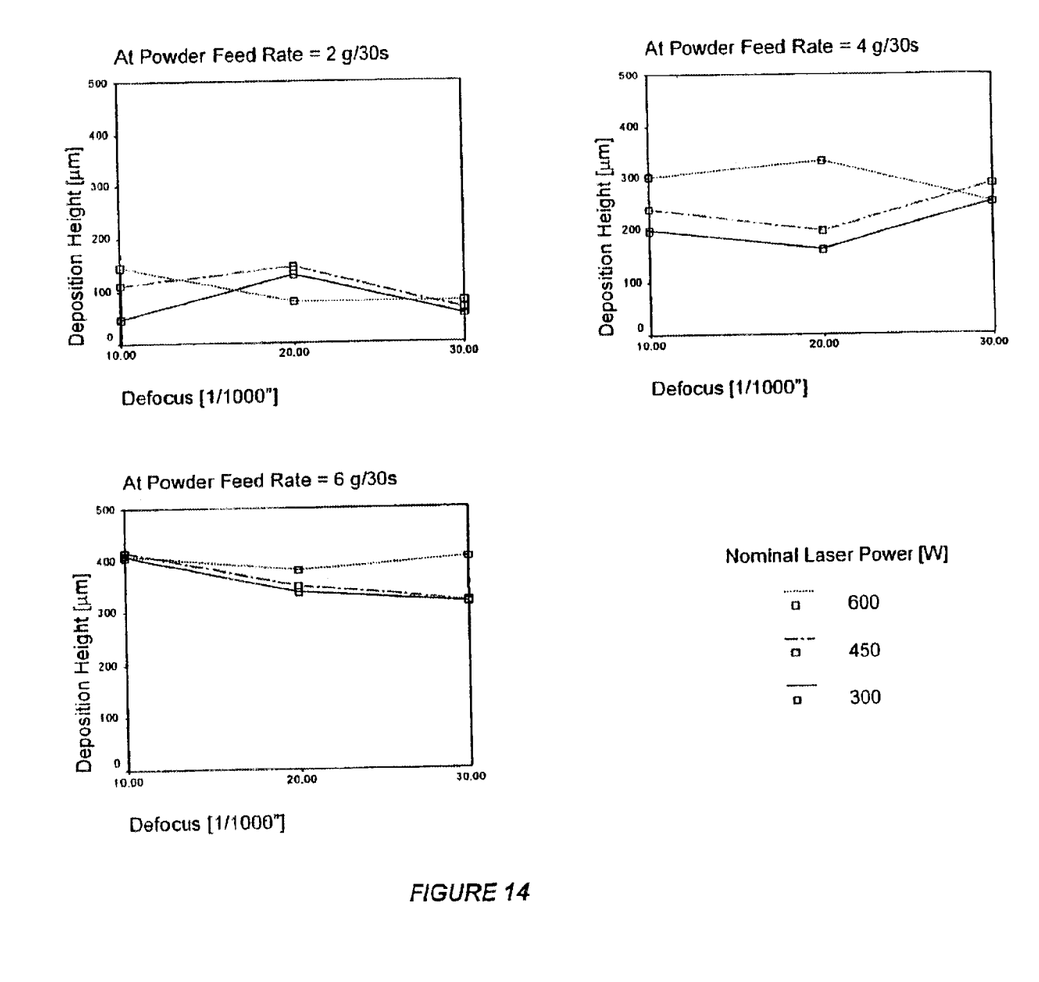
FIG. 14 shows the effect of the beam defocus on deposition height.

As expected, the beam defocus does not show any significant effect on the clad height, as shown in FIG. 14. On average, the height remains relatively constant over differently defocused beams.

A discussed above, since the powder density varies only approximately 8 percent between the most defocused beam and the smallest spot size, no change in this independent parameter is to be expected.

The above example clearly demonstrates that process parameters can be controlled to generate desired line width and height needed for sophisticated single- and multi-dimensional codes, including data matrix codes, using difficult-to-deposit, wear-resistant materials such as H13 tool steel.

I claim:

1. A method of marking a substrate with a computer-readable code, comprising the steps of:
   a) providing a description of the computer-readable code;
   b) heating a localized region of the substrate with a laser to form a melt pool;
   c) feeding material into the melt pool so as to create a material deposit; and
   d) advancing to different localized regions of the substrate until the code is formed using the deposited material in accordance with the description.

2. The method of claim 1, wherein the step of feeding the material includes feeding a powder, a wire, or a tape.

3. The method of claim 1, wherein the substrate is moved while the laser and material feed means remain stationary.

4. The method of claim 1, wherein the laser and material feed are moved while the substrate remains stationary.

5. The method of claim 1, wherein the substrate and deposited material are metallic.

6. The method of claim 1, further including the step of optically monitoring and automatically controlling at least one physical dimension of the deposited material in accordance with the description of the code.

7. The method of claim 6, wherein the dimension includes the height of the material deposit.

8. The method of claim 6, wherein machine-readable code is a three-dimensional code which takes the height of the material deposit into account.

9. The method of claim 1, wherein material deposit is a type of steel.

10. The method of claim 1, wherein material deposit is a nickel-based super alloy.

11. The method of claim 1, wherein material deposit is composed of aluminum, titanium, or an alloy thereof.

* * * * *